(12) United States Patent
Itzkovich et al.

(10) Patent No.: US 12,487,273 B2
(45) Date of Patent: Dec. 2, 2025

(54) OPTIMAL DETERMINATION OF AN OVERLAY TARGET

(71) Applicant: Applied Materials Israel Ltd., Rehovot (IL)

(72) Inventors: Tal Itzkovich, Tel-Aviv (IL); Kevin Ryan Houchens, Rehovot (IL); Nahum Bomshtein, Modi'in-Maccabim-Re'ut (IL); Jenny Perry, Rehovot (IL); Rahul Shenoy, Bangalore (IN); Mohan Gopinathan, Bangalore (IN); Jatin Balodhi, Bangalore (IN); Arjun Das Manaparambil, Bangalore (IN)

(73) Assignee: Applied Materials Israel Ltd., Rehovot (IL)

( * ) Notice: Subject to any disclaimer, the term of this patent is extended or adjusted under 35 U.S.C. 154(b) by 246 days.

(21) Appl. No.: 18/113,595

(22) Filed: Feb. 23, 2023

(65) Prior Publication Data
US 2024/0288488 A1 Aug. 29, 2024

(51) Int. Cl.
*G01R 31/265* (2006.01)
*G06F 30/398* (2020.01)

(52) U.S. Cl.
CPC ....... *G01R 31/2653* (2013.01); *G06F 30/398* (2020.01)

(58) Field of Classification Search
CPC . G01R 31/2653; G06F 30/398; G06T 7/0004; G06T 2207/30148; H01L 22/12;
(Continued)

(56) References Cited

U.S. PATENT DOCUMENTS

| 9,530,199 B1 | 12/2016 | Weinberg |
| 11,054,753 B1 | 7/2021 | Kaplan |

(Continued)

FOREIGN PATENT DOCUMENTS

JP 2015099054 A * 5/2015

OTHER PUBLICATIONS

Drouin, D., Couture, A.R., Joly, D., Tastet, X., Aimez, V. and Gauvin, R. (2007), Casino V2.42—A Fast and Easy-to-use Modeling Tool for Scanning Electron Microscopy and Microanalysis Users. Scanning, 29: 92-101 (Year: 2007).*

(Continued)

*Primary Examiner* — Daniel R Miller
(74) *Attorney, Agent, or Firm* — Lowenstein Sandler LLP

(57) ABSTRACT

There are provided systems and methods comprising obtaining design data of each of a plurality of given overlay targets comprising a plurality of stacked layers, using at least part of the design data to simulate image data of each given overlay target that would have been acquired by an electron beam examination system, using the image data to determine, before actual manufacturing of each given overlay target, second data informative of estimated probability that each given overlay target, upon being manufactured according to the design data, provides measurement data in an overlay measurement process meeting a measurement quality criterion, and using the second data of each given overlay target to select at least one optimal overlay target among the plurality of different overlay targets, wherein the at least one optimal overlay target is usable to be actually manufactured on the semiconductor specimen.

19 Claims, 9 Drawing Sheets

(58) Field of Classification Search
CPC ....... H01L 22/20; H01L 22/10; H01L 23/544; H01L 2223/54426
See application file for complete search history.

(56) References Cited

U.S. PATENT DOCUMENTS

| | | | |
|---|---|---|---|
| 11,562,476 B2 | 1/2023 | Peleg | |
| 12,131,458 B2 | 10/2024 | Peleg | |
| 2007/0220476 A1* | 9/2007 | Mukherjee | G03F 1/36 |
| | | | 716/55 |
| 2009/0199137 A1* | 8/2009 | Huckabay | G06F 30/39 |
| | | | 430/30 |
| 2014/0037187 A1* | 2/2014 | Marcuccilli | G06T 7/001 |
| | | | 382/149 |
| 2017/0294012 A1* | 10/2017 | Sah | G06T 7/0004 |
| 2024/0062355 A1 | 2/2024 | Alumot | |

OTHER PUBLICATIONS

Benjamin D. Bunday, Shari Klotzkin, Douglas Patriarche, Maseeh Mukhtar, Kotaro Maruyama, Seul-Ki Kang, Yuichiro Yamazaki, "Simulating process subtleties in SEM imaging," Proc. SPIE 12053, Metrology, Inspection, and Process Control XXXVI, 120530A (May 26, 2022) (Year: 2022).*

Benjamin D. Bunday, Maseeh Mukhtar, Kathy Quoi, Brad Thiel, Matt Malloy, "Simulating massively parallel electron beam inspection for sub-20 nm defects," Proc. SPIE 9424, Metrology, Inspection, and Process Control for Microlithography XXIX, 94240J (Mar. 19, 2015) (Year: 2015).*

* cited by examiner

OPTIMAL DETERMINATION OF AN OVERLAY TARGET

TECHNICAL FIELD

The presently disclosed subject matter relates, in general, to the field of examination of a specimen.

BACKGROUND

Current demands for high density and performance, associated with ultra large-scale integration of fabricated devices, require submicron features, increased transistor and circuit speeds, and improved reliability. Such demands require formation of device features with high precision and uniformity, which, in turn, necessitates careful monitoring of the fabrication process, including automated examination of the devices while they are still in the form of semiconductor wafers.

Examination processes are used at various steps during semiconductor fabrication to measure dimensions of the specimens (metrology), and/or to detect and classify defects on specimens (e.g., Automatic Defect Classification (ADC), Automatic Defect Review (ADR), etc.).

GENERAL DESCRIPTION

In accordance with certain aspects of the presently disclosed subject matter, there is provided a system comprising a processor and memory circuitry (PMC), the PMC being configured to for each given overlay target of a plurality of different overlay targets to be manufactured on a semiconductor specimen, said given overlay target comprising a plurality of stacked semiconductor layers, obtain design data of the given overlay target, use at least part of the design data to simulate image data of the given overlay target that would have been acquired by an electron beam examination system, use the image data to determine, before actual manufacturing of the given overlay target, second data informative of estimated probability that the given overlay target, upon being manufactured according to the design data, provides measurement data in an overlay measurement process meeting a measurement quality criterion, and use the second data of each given overlay target to select at least one optimal overlay target among the plurality of different overlay targets, wherein the at least one optimal overlay target is usable to be actually manufactured on the semiconductor specimen.

According to some examples, the system is configured to obtain one or more parameters of the electron beam examination system, and use the one or more parameters and at least part of the design data to simulate image data of the given overlay target that would have been acquired by the electron beam examination system.

According to some examples, the system is configured to obtain data informative of a plurality of overlay values, for at least one given overlay target, for each given overlay value of the plurality of overlay values, use at least part of the design data to simulate image data of the given overlay target associated with the given overlay value, that would have been acquired by the electron beam examination system, thereby obtaining a set of a plurality of image data, and use the set of a plurality of image data to determine, before actual manufacturing of the given overlay target, second data informative of estimated probability that the given overlay target, upon being manufactured according to the design data, provides measurement data in an overlay measurement process meeting the measurement quality criterion.

According to some examples, the system is configured to determine, for each given image data of the set of a plurality of image data, obtained for the given overlay target associated with the given overlay value, a given simulated overlay value, wherein the second data is informative of a difference between the given simulated overlay value and the given overlay value.

According to some examples, the system is configured to, upon manufacturing of the optimal overlay target, obtain an inspection image of the optimal overlay target acquired using an electron beam examination system, and determine actual values for the second data based on the inspection image.

According to some examples, the system is configured to perform a comparison of at least part of the actual values for the second data determined based on the inspection image of the optimal overlay target, with at least part of the second data determined based on the image data of the optimal overlay target.

According to some examples, the system is configured to use the actual values for the second data to update at least part of the design data of the optimal overlay target, or of another overlay target of the plurality of different overlay targets, or of another overlay target to be manufactured on a specimen.

According to some examples, the second data includes different attributes associated with a plurality of weights, wherein each given attribute is associated with a given weight, wherein the system is configured to use the actual values to update one or more of the weights.

According to some examples, the system is configured to, upon manufacturing of the optimal overlay target, obtain an inspection image of the optimal overlay target acquired using an electron beam examination system, and determine one or more actual values for the overlay in the inspection image, and compare with one or more values for the overlay as defined in the design data.

According to some examples, the second data is informative of a quality of the image data.

According to some examples, for at least one given overlay target, the system is configured to obtain design data together with variation data informative of variations of at least part of the design data, simulate a plurality of image data of the given overlay target with design data varying according to said variation data, that would have been acquired by the electron beam examination system, and use the plurality of image data, to determine, before actual manufacturing of the given overlay target, a plurality of second data informative of estimated probability that the given overlay target, upon being manufactured according to said design data associated with said variation data, provides measurement data in an overlay measurement process meeting the measurement quality criterion.

According to some examples, the variation data is informative of variations in at least one of thickness, or material, or density.

According to some examples, the system is configured to determine, for at least one given overlay target, data informative of an impact of one or more variations of at least part of the design data on an ability of the given overlay target, upon being manufactured according to said design data associated with said one or more variations, to provide measurement data in an overlay measurement process meeting the measurement quality criterion.

According to some examples, the system is configured to perform a sequence comprising: (1) for each given overlay target of a first plurality of different overlay targets to be manufactured on a semiconductor specimen, said given overlay target comprising a plurality of stacked semiconductor layers: obtain design data of the given overlay target, use at least part of the design data to simulate image data of the given overlay target that would have been acquired by an electron beam examination system, use the image data to determine, before actual manufacturing of the given overlay target, simulated second data informative of estimated probability that the given overlay target, upon being manufactured according to the design data, provides measurement data in an overlay measurement process meeting a measurement quality criterion, and use the simulated second data of each given overlay target to select at least one optimal overlay target among the first plurality of different overlay targets, (2) upon manufacturing of the optimal overlay target, obtain an image thereof, and use the image to determine actual values for the second data and (3) repeat (1) for a second plurality of overlay targets, different from the first plurality of different targets.

According to some examples, the system is configured to perform a comparison between the actual values for the second data of the optimal overlay target with the simulated second data of the optimal overlay target, and output data informative of the comparison.

In accordance with certain aspects of the presently disclosed subject matter, there is provided a computer-implemented method comprising for each given overlay target of a plurality of different overlay targets to be manufactured on a semiconductor specimen, said given overlay target comprising a plurality of stacked semiconductor layers, obtaining design data of the given overlay target, using at least part of the design data to simulate image data of the given overlay target that would have been acquired by an electron beam examination system, using the image data to determine, before actual manufacturing of the given overlay target, second data informative of estimated probability that the given overlay target, upon being manufactured according to the design data, provides measurement data in an overlay measurement process meeting a measurement quality criterion, and using the second data of each given overlay target to select at least one optimal overlay target among the plurality of different overlay targets, wherein the at least one optimal overlay target is usable to be actually manufactured on the semiconductor specimen.

According to some examples, the method comprises obtaining one or more parameters of the electron beam examination system, and using the one or more parameters and at least part of the design data to simulate image data of the given overlay target that would have been acquired by the electron beam examination system.

According to some examples, the method comprises obtaining data informative of a plurality of overlay values, for at least one given overlay target, for each given overlay value of the plurality of overlay values, using at least part of the design data to simulate image data of the given overlay target associated with the given overlay value, that would have been acquired by the electron beam examination system, thereby obtaining a set of a plurality of image data, and using the set of a plurality of image data to determine, before actual manufacturing of the given overlay target, second data informative of estimated probability that the given overlay target, upon being manufactured according to the design data, provides measurement data in an overlay measurement process meeting the measurement quality criterion.

According to some examples, the method comprises for at least one given overlay target, obtaining design data together with variation data informative of variations of at least part of the design data, simulating a plurality of image data of the given overlay target with design data varying according to said variation data, that would have been acquired by the electron beam examination system, and using the plurality of image data, to determine, before actual manufacturing of the given overlay target, a plurality of second data informative of estimated probability that the given overlay target, upon being manufactured according to said design data associated with said variation data, provides measurement data in an overlay measurement process meeting the measurement quality criterion.

According to some examples, the method comprises implementing one or more features described with respect to the system above.

In accordance with certain aspects of the presently disclosed subject matter, there is provided a non-transitory computer readable medium comprising instructions that, when executed by a processor and memory circuitry (PMC), cause the PMC to perform operations as described above with respect to the method.

According to some examples, the proposed solution enables determining optimal overlay targets. According to some examples, the proposed solution automates determination of optimal overlay targets. According to some examples, the proposed solution improves overlay measurements in a semiconductor specimen. According to some examples, the proposed solution enables determining optimal overlay targets in a more efficient way, within a shorter time, and with a reduced number of manufacturing operations. According to some examples, the proposed solution predicts impact of variations in the design parameters on the overlay targets to be manufactured.

BRIEF DESCRIPTION OF THE DRAWINGS

In order to understand the disclosure and to see how it may be carried out in practice, embodiments will now be described, by way of non-limiting example only, with reference to the accompanying drawings, in which.

DETAILED DESCRIPTION OF EMBODIMENTS

In the following detailed description, numerous specific details are set forth in order to provide a thorough understanding of the disclosure. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "obtaining", "using", "determining", "comparing", "simulating", or the like, refer to the action(s) and/or process(es) of a computer that manipulate and/or transform data into other data, said data represented as physical, such as electronic, quantities and/or said data representing the physical objects.

Figure 1:
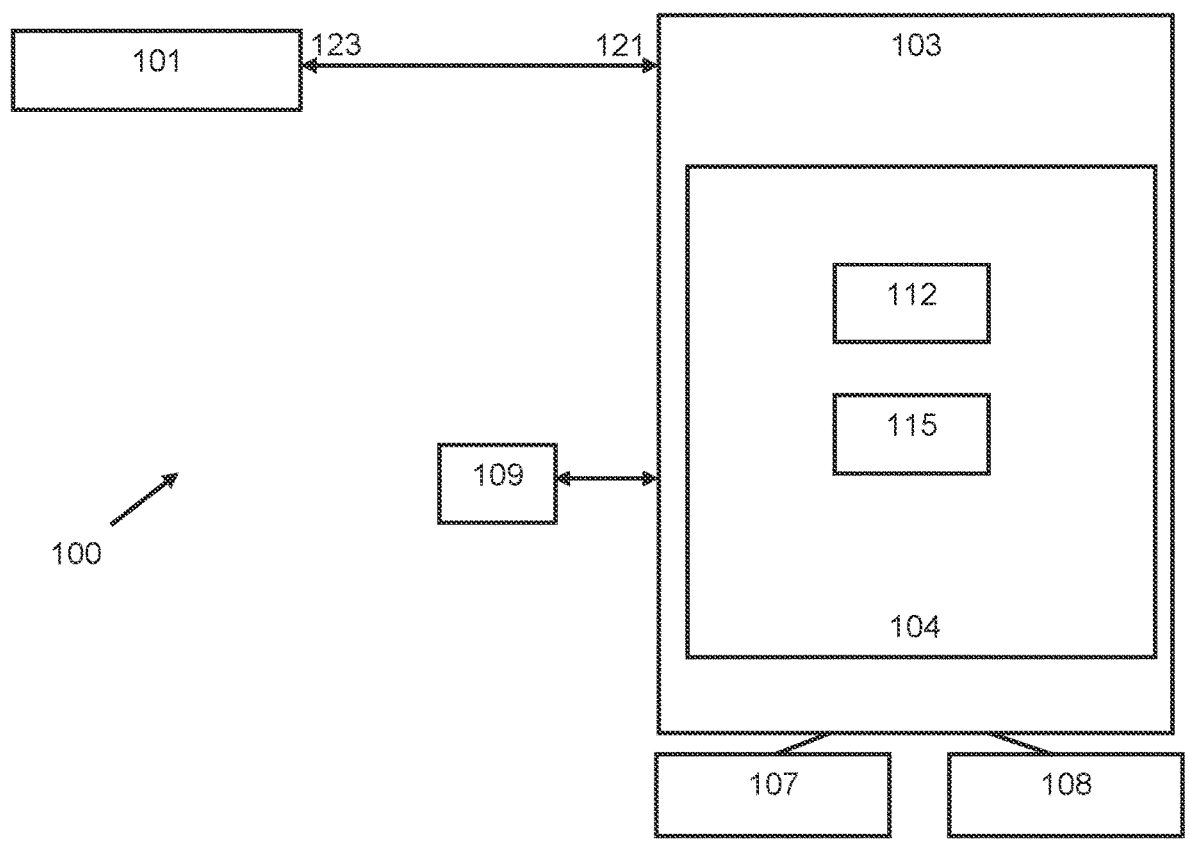
FIG. 1 illustrates a generalized block diagram of an examination system in accordance with certain embodiments of the presently disclosed subject matter.

The terms "computer" or "computer-based system" should be expansively construed to include any kind of hardware-based electronic device with a data processing circuitry (e.g., digital signal processor (DSP), a GPU, a TPU, a field programmable gate array (FPGA), an application specific integrated circuit (ASIC), microcontroller, microprocessor etc.), including, by way of non-limiting example, the computer-based system 103 of FIG. 1 and respective parts thereof disclosed in the present application. The data processing circuitry (designated hereinafter as processor and memory circuitry) can comprise, for example, one or more processors operatively connected to computer memory, loaded with executable instructions for executing operations, as further described below. The data processing circuitry encompasses a single processor or multiple processors, which may be located in the same geographical zone, or may, at least partially, be located in different zones, and may be able to communicate together.

The term "specimen" used in this specification should be expansively construed to cover any kind of wafer, masks, and other structures, combinations and/or parts thereof used for manufacturing semiconductor integrated circuits, magnetic heads, flat panel displays, and other semiconductor-fabricated articles.

The term "examination" used in this specification should be expansively construed to cover any kind of metrology-related operations, as well as operations related to detection and/or classification of defects in a specimen during its fabrication. Examination is provided by using non-destructive examination tools, during or after manufacture of the specimen to be examined. By way of non-limiting example, the examination process can include runtime scanning (in a single or in multiple scans), sampling, reviewing, measuring, classifying and/or other operations provided with regard to the specimen or parts thereof, using the same or different inspection tools. Likewise, examination can be provided prior to manufacture of the specimen to be examined, and can include, for example, generating an examination recipe (s) and/or other setup operations. It is noted that, unless specifically stated otherwise, the term "examination" or its derivatives used in this specification are not limited with respect to resolution or size of an inspection area.

The term "design data" used in the specification should be expansively construed to cover any data indicative of hierarchical physical design (layout) of a specimen. In some examples, it can be informative of one or more three-dimensional structures. Design data can be provided by a respective designer and/or can be derived from the physical design (e.g., through complex simulation, simple geometric and Boolean operations, etc.). Design data can be provided in different formats such as, by way of non-limiting examples, GDSII format, OASIS format, etc. Design data can be presented in vector format, grayscale intensity image format, or otherwise.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

In embodiments of the presently disclosed subject matter, fewer, more, and/or different stages than those shown in the methods of FIGS. 3A, 3B, 5A and 6 may be executed. In embodiments of the presently disclosed subject matter, one or more stages illustrated in the methods of FIGS. 3A, 3B, 5A and 6 may be executed in a different order, and/or one or more groups of stages may be executed simultaneously.

Bearing this in mind, attention is drawn to FIG. 1 illustrating a functional block diagram of an examination system in accordance with certain embodiments of the presently disclosed subject matter. The examination system 100 illustrated in FIG. 1 can be used for examination of a specimen (e.g., of a wafer and/or parts thereof) as part of the specimen fabrication process. The illustrated examination system 100 comprises computer-based system 103. According to some examples, system 103 can generate various data informative of overlay. According to some examples, system 103 is capable of automatically determining metrology-related information and/or defect-related information using images obtained during specimen fabrication. System 103 can be operatively connected to one or more examination tools 101. The examination tool 101 is configured to capture images and/or to review the captured image(s) and/or to enable or provide measurements related to the captured image(s).

System 103 includes a processor and memory circuitry (PMC) 104, which includes a processor (not shown separately) and a memory (not shown separately). PMC 104 is configured to provide all processing necessary for operating the system 103, and, in particular, for processing the images captured by the examination tool(s) 101.

Figure 2A:
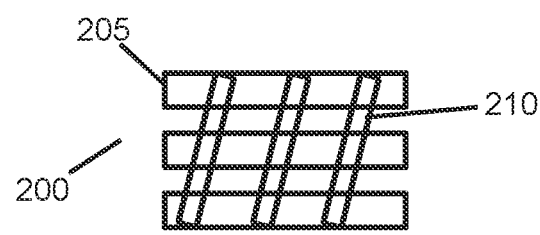
FIG. 2A illustrates a non-limitative example of a semiconductor specimen.
Figure 2B:
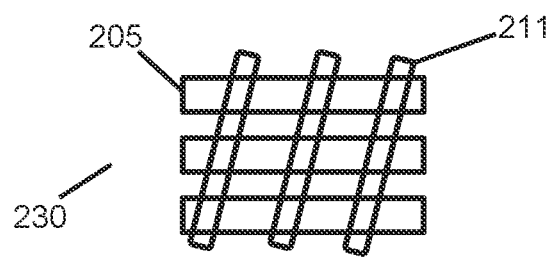
FIG. 2B illustrates a non-limitative example of an overlay target associated with the semiconductor specimen of FIG. 2A.

As mentioned above, system 103 is usable to generate various data informative of overlay. Overlay measurement includes the measurement of the alignment in a three-dimensional specimen, between different features (typically belonging to different layers) and/or between different layers. Non-limitative examples of features include gates, contacts, transistors, etc. In order to measure overlay (for a given specimen and/or for a given manufacturing process), targets (also called "overlay targets") can be manufactured on the specimen. An overlay target typically includes a plurality of stacked semiconductor layers. In some examples, the overlay target may differ from the actual design of the semiconductor specimen. This is performed intentionally, in order to facilitate overlay measurement. A non-limitative example is provided in FIGS. 2A and 2B. Assume that the actual design of a specimen 200 corresponds to the design depicted in FIG. 2A, in which a top layer of the specimen 200 includes features 205 and a bottom layer of the specimen 200 includes features 210. A non-limitative example of an overlay target 230 is illustrated in FIG. 2B, which includes a top layer with the same features 205 as the specimen 200, and a bottom layer with features 211, different from features 210. Features 211 differ from features 210 in that features 211 are longer than features 210. This design of the overlay target 230 facilitates overlay measurement between the top layer and the bottom layer, since features 211 can be more easily identified in an image (such as a SEM image) than features 210. Note that this design of an overlay target is only an example and is not limitative.

According to some examples, PMC 104 implements at least one simulation software 112. As explained hereinafter, the simulation software 112 is operative to receive design data of an overlay target, and parameters of an electron beam examination system (such as SEM), in order to simulate an image of the overlay target that would have been acquired by the electron beam examination system. In some examples, the simulation can include an electron beam Monte Carlo simulation. For example, the simulation software 112 can correspond to the "CASINO" software (CASINO is the acronym of "monte CArlo SImulation of electroN trajectory in sOlids"). This is not limitative.

According to some examples, PMC 104 implements at least one overlay measurement software 115. As explained hereinafter, the overlay measurement software 115 is configured to receive an image (which can be a simulated image, or an actual image) of an overlay target (or of any other semiconductor specimen) including a plurality of stacked layers, and to determine overlay between different layers (and/or between different features belonging to different layers). According to some examples, the overlay measurement software 115 can use the methods described in U.S. Pat. Nos. 11,054,753, 9,530,199, or U.S. Ser. No. 17/893,082 (content of these documents are incorporated herein by reference). This is however not limitative and the overlay measurement software 115 can use other adapted overlay measurement methods.

System 103 is configured to receive input data. As explained hereinafter, input data can include design data informative of a plurality of overlay targets, which can be stored e.g., in one or more data repositories 109. According to some examples, input data can include data 121 produced by the examination tool 101, which can include images (e.g., captured images, images derived from the captured images, simulated images, synthetic images, etc.) and associated data (e.g., hand-crafted attributes, metadata such as pixel size, text description of defect type, parameters of image capturing process, etc.). According to some examples, PMC 104 can send instructions 123 to the examination tool(s) 101.

By way of non-limiting example, a specimen can be examined by one or more examination tools 101 which can include a scanning electron microscope (SEM) and/or an Atomic Force Microscopy (AFM)) and/or any other adapted electron beam examination system. The resulting data (image data 121), informative of images of the specimen, can be transmitted—directly or via one or more intermediate systems—to system 103.

Upon processing the input data, system 103 can store the results (which can include for example data informative of overlay targets, such as selection of an optimal overlay target which is the most adapted to enable accurate overlay measurements, data informative of an impact of one or more design parameters, data informative of robustness of overlay targets in the presence of variations in the design data, etc.) in storage system 107, render the results via GUI 108 and/or send them to an external system. As mentioned above, system 103 may use the results to send instructions to the examination tool(s) 101.

Figure 3A:
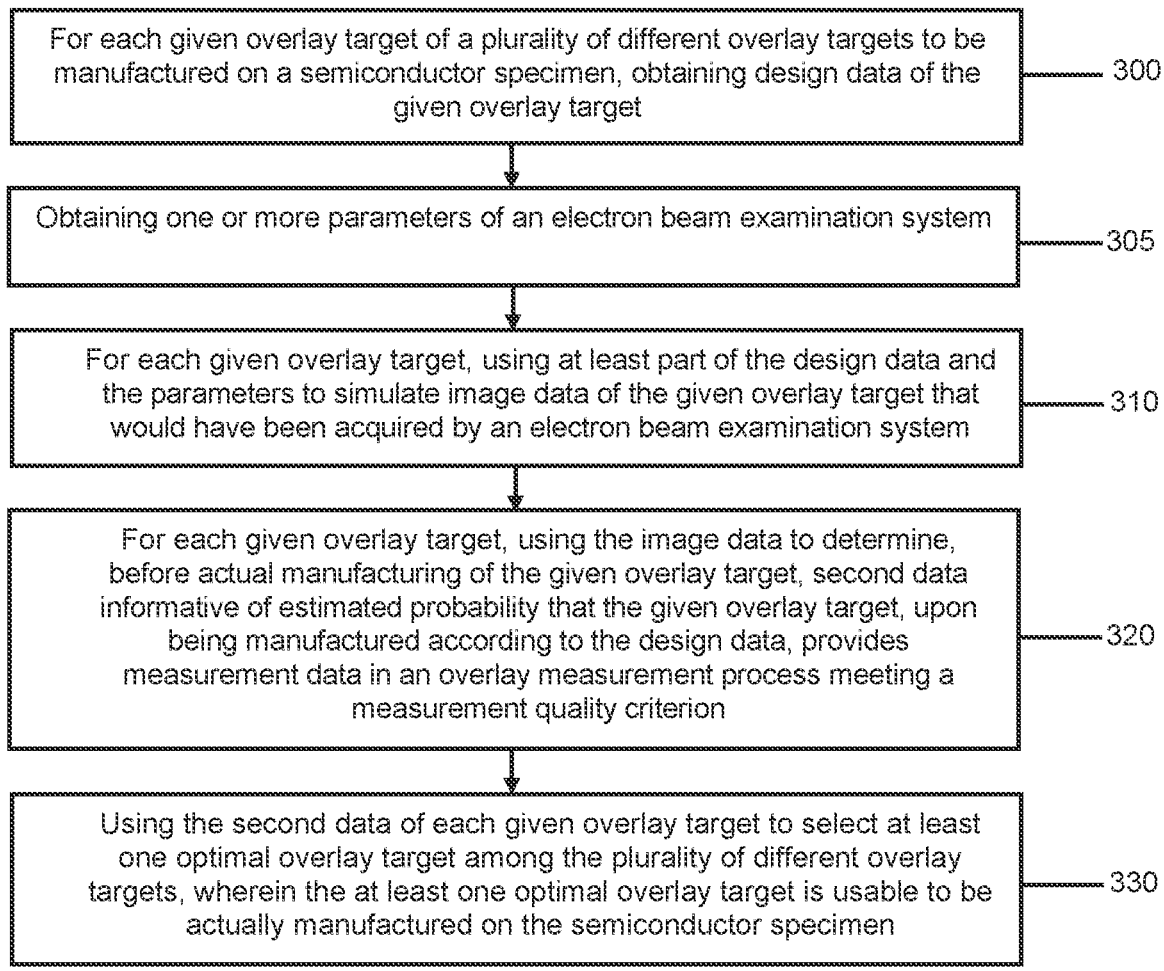
FIG. 3A illustrates a generalized flow-chart of a method of determining an optimal overlay target.

Attention is now drawn to FIG. 3A, which depicts a method of selecting at least one overlay target (designated as optimal overlay target) among a plurality of (candidate) overlay targets, according to some examples of the invention.

Assume that a plurality of different overlay targets (candidate overlay targets) has been designed. As mentioned above, each overlay target includes a plurality of stacked semiconductor layers and can be used to determine overlay measurements. In some examples, the plurality of different overlay targets has been designed by a user (such as a semiconductor manufacturer), in order to determine overlay measurements for a given manufacturing process and/or for a given semiconductor specimen. In some examples, most or all of the overlay targets have not yet been manufactured, and have only been designed prior to their manufacturing. According to some examples, the method of FIG. 3A enables selecting one or more optimal overlay targets among the plurality of overlay targets (before actual manufacturing of the overlay targets), for which it is expected to obtain accurate overlay measurements.

The method of FIG. 3A includes obtaining (operation 300), for each given overlay target of the plurality of different overlay targets to be manufactured on a semiconductor specimen, design data of the given overlay target. The design data can include, for the given overlay target, properties of the stacked layers (e.g., materials, thickness, density), shapes of the features (e.g., lines, rectangles, etc.), layout of the features, frequency of repetition of the features, dimensions of the features (for example, critical dimension of the features), data informative of the three-dimensional profile of the features (e.g., top or bottom critical dimension, rounding, footing, asymmetry of the features, etc.), dimension of the overlay target, pitch (distance between clusters of features), etc. In some examples, the design data can include a design image, which is associated with data informative of pixel size in the design image. In some examples, the overlay targets can differ by at least one property, such as a type of material of one or more features, a thickness of one or more features or of one or more layers, a density of one or more features, geometry and/or layout of one or more features, etc.

The design data can include data in the X-Y plane (plane of each semiconductor layer), and along the Z axis (height axis, orthogonal to the plane of the semiconductor layers). The design data can be for example provided by a manufacturer, since the manufacturer has detailed knowledge of the parameters of the manufacturing process and/or the properties of the specimen to be manufactured. This is however not limitative. In some examples, the various candidate overlay targets can be designed to test overlay of a given manufacturing process.

According to some examples, the overlay targets can be associated with data informative of one or more different overlay values (overlay errors). This will be further discussed hereinafter with respect to FIG. 5A. In some examples, the data informative of one or more overlay values may be part of the design data. An overlay error corresponds to a deviation from a desired alignment of layers and/or features. For example, a user (such as a manufacturer) can indicate that for a given manufacturing process, it is expected to have an overlay error which varies between −2 nm and +2 nm (these values are not limitative). Data informative of one or more overlay values can include this expected range.

The method of FIG. 3A further includes (operation 305) obtaining one or more parameters of an electron beam examination system. These parameters can include acquisition parameters, such as (but not limited to) beam energy, landing energy, pixel size, field of view, etc. These parameters can correspond to acquisition parameters of an electron beam examination system that will be used to measure overlay of the manufactured overlay targets.

The method of FIG. 3A further includes (operation 310), for each given overlay target, using at least part of the design data to simulate image data (also called simulated image) of the given overlay target that would have been acquired by an electron beam examination system (see reference 101). In other words, before actual manufacturing of the given overlay target, it is possible to simulate an image of the given overlay target as acquired by the electron beam examination system. This simulation can be performed by the simulation software 112, which receives the parameters of the electron beam examination system (such as landing energy, pixel size, field of view, etc.), and the design data of the given overlay target. Note that the image data (simulated image) can include one or more 2D images, or one or more 1D images (electron yield or grey level intensity along one axis). Use of a 1D image reduces computation and can be adapted for an overlay target including features with some symmetry. In this case, a slice of the electron yield or grey level intensity along one axis (e.g., X axis) is already characteristic of the features. According to some examples, the image data includes at least two images: a first image of the two images simulates a SEM image acquired from backscattered electrons (also called backscattered image) and a second image of the two images simulates a SEM image acquired from secondary electrons (also called secondary electron image). Note that these two images may reflect different depths of the target: one image may reflect the surface of the target and the other may reflect in-depth features of the target.

Figure 4A:
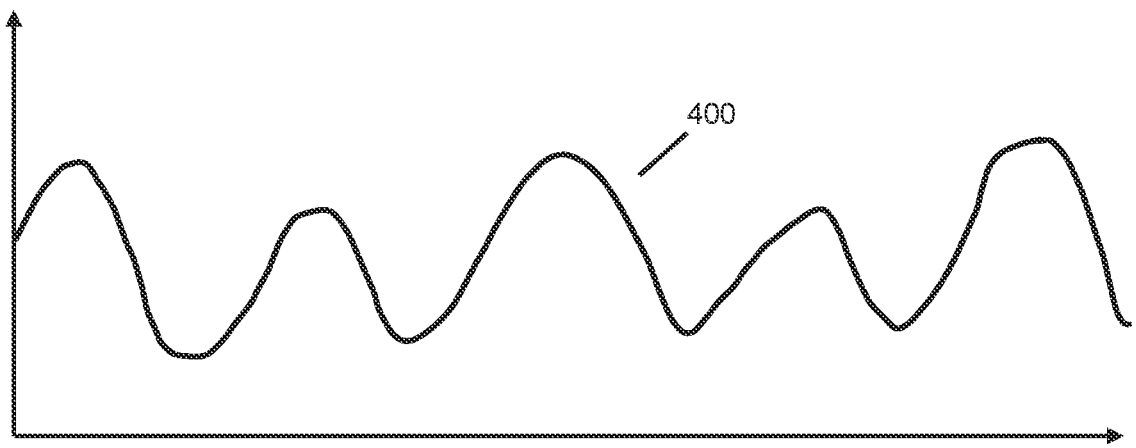
FIG. 4A illustrates an example of image data that can be generated using the method of FIG. 3A or of FIG. 3B.

FIG. 4A illustrates a non-limitative example of image data 400 that can be obtained at operation 310. In this example, image data 400 corresponds to a (simulated) electron yield or grey level intensity along a slice of the overlay target (1D image data). As mentioned above, 2D image data can also be simulated (this option is not represented).

According to some examples, it is possible, for a given overlay target, to simulate image data for different values of the parameters of the electron beam examination system (for example, different beam energies, different pixel sizes, etc.) and/or for different values of the design data (for example, different materials, different material densities, different overlay errors, etc.). For each set of values, different image data (different images) can be obtained for a given overlay target. In other words, for a given overlay target, it is possible to obtain a set of a plurality of different image data, wherein each image data is associated with a different set of design data and/or different parameters of the electron beam examination system. This will be discussed hereinafter with reference to FIG. 3B.

The method of FIG. 3A further includes (operation 320), for each given overlay target, using the image data to determine second data, before actual manufacturing of the given overlay target. The second data are informative of estimated probability that the given overlay target, upon being manufactured according to the design data, provides measurement data in an overlay measurement process meeting a measurement quality criterion. The measurement quality criterion can indicate that the overlay target is usable to determine accurate overlay measurements. The measurement quality criterion can indicate, for example, that the image (corresponding to the measurement data) obtained using the given overlay target (upon being manufactured) will have a sufficient quality to enable measuring overlay with a required accuracy. It can also indicate that the variations in the overlay measurement data are sufficiently visible/measurable in the image (corresponding to the measurement data) obtained using the given overlay target. In other words, the second data can be used to predict whether the given overlay target will be adapted to obtain accurate overlay measurements. According to some examples, the measurement quality criterion can indicate that the measurement data obtained with the overlay target are repeatable (e.g. over different acquisitions sessions with similar acquisition parameters) and/or accurate.

The second data can be computed using the image data. Note that the ability to perform accurate overlay measurements based on image(s) acquired from a manufactured overlay target depend inter alia on the quality of the image(s) that can be acquired from the manufactured overlay target. Indeed, the higher the quality of the image, the higher the ability to identify (by an image processing algorithm) features and/or layers, and/or the higher the ability to differentiate (by an image processing algorithm) between different features and/or different layers. As a consequence, according to some examples, the second data can include data informative of the quality of the image data, which provides an estimate of the quality of the image that will be acquired by the electron beam examination system from the given overlay target upon its manufacturing (and, in turn, of the probability to obtain accurate overlay measurements with this given overlay target).

Data informative of the quality of the image data can include various attributes such as the contrast of the image data, the number of features visible in the image data (which can be compared to the true number of features of the overlay target), signal to noise ratio of the image data, or any other adapted parameter usable to characterize the quality of the image data. For some of the attributes, the higher the value of the attribute (such as contrast, signal to noise ratio, etc.), the higher the probability that the given overlay target, upon being manufactured according to the design data, provides measurement data in an overlay measurement process meeting the measurement quality criterion.

Figure 4B:
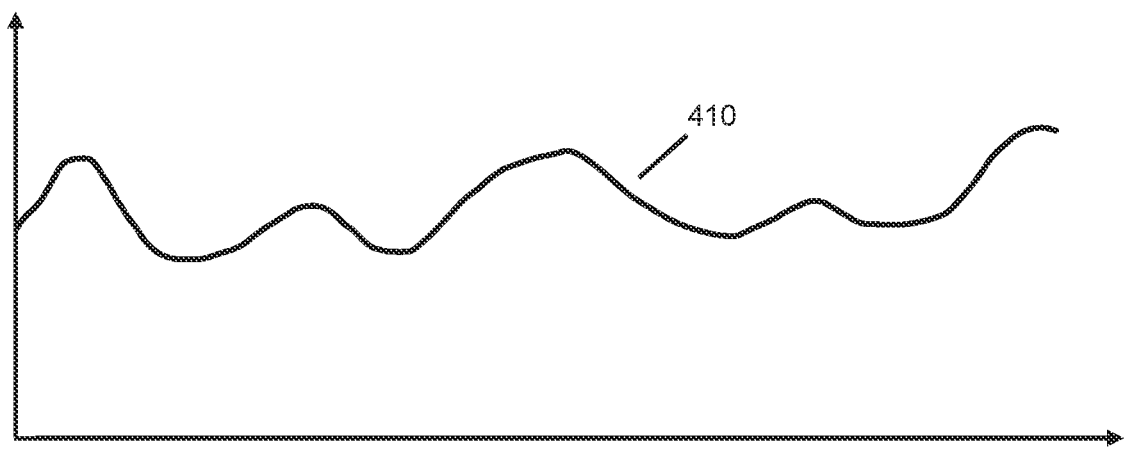
FIG. 4B illustrates another example of image data that can be generated using the method of FIG. 3A or of FIG. 3B.

FIG. 4B depicts an example of image data 410 in which the features of the overlay target (represented by the peaks) are less differentiable than in the image data 400 of FIG. 4A. In other words, the quality of the image data 410 is lower than the quality of the image data 400. As a consequence, the overlay target from which image data 410 have been generated, has a higher probability to provide accurate overlay measurements than the overlay target from which image data 400 have been generated. Note that this example is not limitative.

The method of FIG. 3A further includes (operation 330) using the second data of each given overlay target to select at least one optimal overlay target among the plurality of different overlay targets. At this stage, the candidate overlay targets (from which design data have been obtained at operation 300) have not necessarily been manufactured, and it is desired to predict which candidate overlay target(s) will be (upon their manufacturing on a specimen) the most optimal in order to obtain accurate overlay measurements. For each given overlay target, second data have been computed, which are usable to predict which overlay target(s) (designated as optimal overlay measurements) are the most promising to enable accurate overlay measurements.

According to some examples, for each given overlay target, the second data can be used to compute a score (aggregating the different values obtained for the second data), which indicates the probability that the overlay target will be associated (upon its manufacturing on a specimen) with accurate overlay measurements. For example, assume that for each image data, contrast and signal to noise ratio have been computed. A score can be computed which reflects the value of the contrast and the value of the signal to noise ratio. In this example, the higher the values of the contrast and of the signal to noise ratio, the higher the score, and the lower the values of the contrast and of the signal to noise ratio, the lower the score. Note that a different weight (or the same weight) can be assigned to each attribute. The value of the contrast can be, in some examples, scaled with respect to a reference value, in order to be comparable with other contrast values (for example, the contrast can be scaled within a range between 0 and 100%). The same applies to the signal to noise ratio, or to other attributes. Note that the score can be computed using different attributes of the second data and/or with a different number of attributes of the second data.

According to some examples, operation 330 can include selecting the candidate given overlay target(s) with the highest score as the optimal overlay target(s). The optimal overlay target, selected among the plurality of different overlay targets, can be output (for example on a display) to a user.

According to some examples, a machine learning model (implemented for example by PMC 104) can be trained to select the optimal overlay target based on the second data computed for the plurality of overlay targets. Non-limitative examples of machine learning models include deep neural networks. Training of the machine learning model can be performed using supervised learning. During the training, an operator indicates the optimal overlay target (label) based on the second data. Once the machine learning model has been trained, it is able to predict the optimal overlay target using the second data.

According to some examples, once the optimal overlay target has been identified, the optimal overlay target can be manufactured (using its design data) on a specimen. Note that contrary to prior art methods, it is possible to predict in advance which overlay target(s) will provide accurate overlay measurements, and to manufacture only the optimal overlay target(s). As explained hereinafter (see FIG. 6), it is possible to acquire image(s) of the manufactured optimal overlay target, use the image(s) to determine data informative of the manufactured optimal overlay target, and compare these data with the simulated data computed based on the simulated image data.

For example, it is possible to use the image to determine actual values of attributes (contrast, signal to noise ratio, etc.) used in the second data, and to compare these actual values with the simulated values of the corresponding attributes used in the second data. Feedback can be provided to a user. If there is a match, this can indicate that the manufactured optimal overlay target is usable for determining accurate overlay measurements. According to some examples, if there is a mismatch, this can indicate that the process of FIG. 3A needs to be repeated with a different set of candidate overlay targets, among which one or more optimal target(s) have to be identified. According to some examples, if there is a mismatch, the weights used for each attribute of the second data to compute a score for each overlay target (as explained above) can be adjusted. For example, assume that a first overlay target and a second overlay target have been manufactured, and that the first overlay target had a better score than the second overlay target based on the simulated values of the second data. Assume that the manufactured second overlay target provides measurement data in an overlay measurement process meeting the measurement quality criterion better than the manufactured first overlay target (this indicates e.g., a better accuracy and/or a better repeatability of the measurements associated with the manufactured second overlay target). The weights used to compute the score during the simulation can be updated to reflect the fact that the second overlay target should receive a higher score than the first overlay target. This is not limitative.

In some examples, it is possible to determine overlay measurement data using the image(s) of the manufactured optimal overlay target, and to determine whether the overlay measurement data meets the measurement quality criterion. For example, assume that it is known that the manufactured optimal overlay target is associated with a given value of the overlay between two layers. The overlay can be measured using the image of the manufactured optimal overlay target, and compared with the given value: a match (within a certain tolerance margin) indicates that the measurement quality criterion is met, whereas a mismatch indicates that the measurement quality criterion is not met. Note that for a given overlay target, a plurality of overlay values can be obtained (since there are different layers and different overlay values can be obtained between different pairs of layers, and/or different overlay values can be obtained depending on the axes, such as the X or Y axis). In some examples, since the overlay measurements are obtained from an electron beam examination system, it is possible to measure actual overlay between individual features (belonging for example to different layers). For example, it is possible to measure actual overlay between a first feature belonging to a first layer and a second feature belonging to a second layer. This actual overlay (computed for individual features) can be compared to the expected overlay (as defined in the design data) for these features. Note that this is not limitative, and, in some examples, it is possible to determine an average actual overlay, computed for a plurality of features. Feedback can be provided to a user. If there is a mismatch, a new set of overlay targets can be generated, and the process of FIG. 3A can be repeated with this new set of overlay targets. The process can be repeated until a convergence criterion is met. The convergence criterion can define that the process can be stopped when an overlay target has been manufactured, for which the overlay measurement data meets the measurement quality criterion.

Figure 3B:
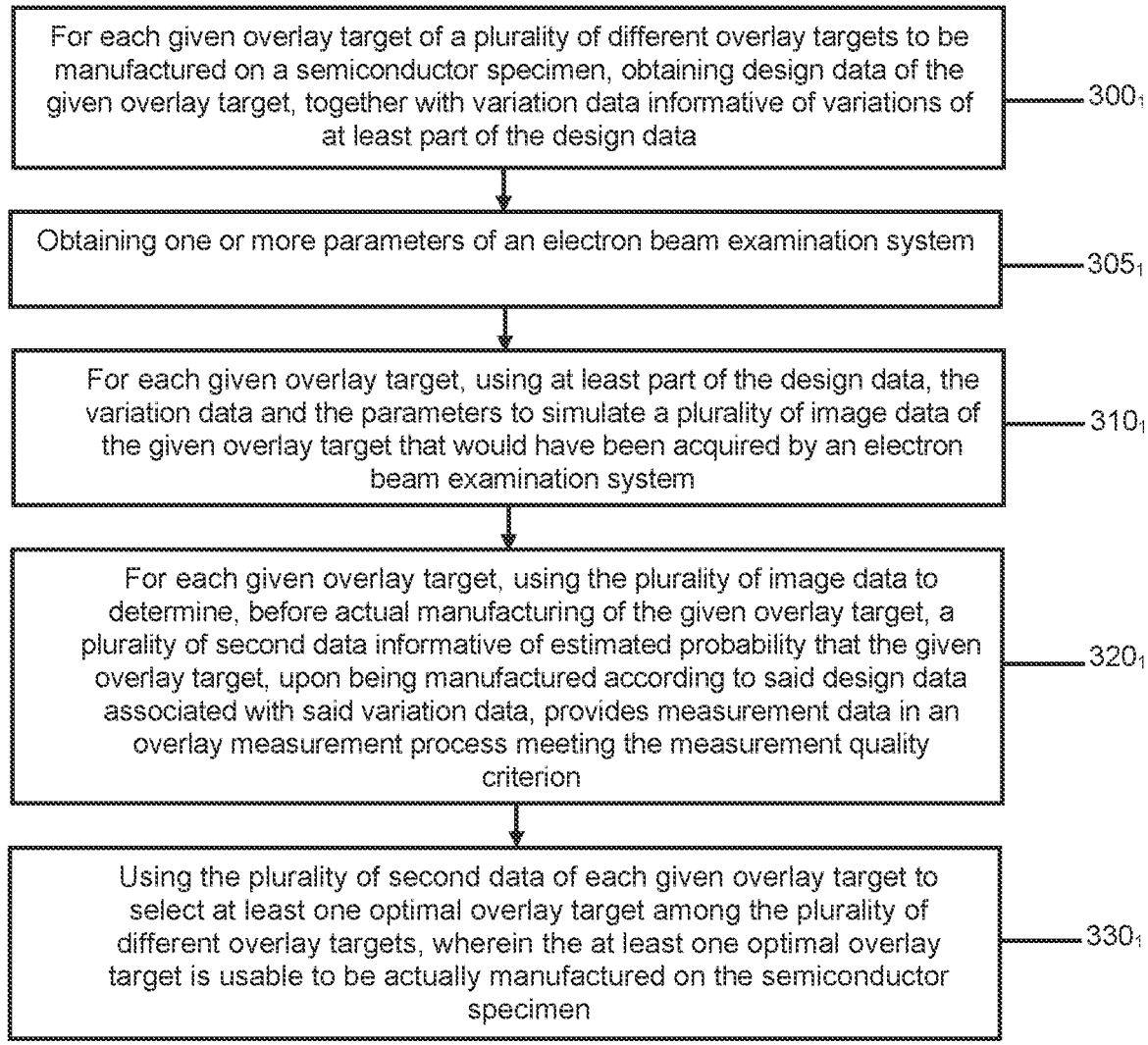
FIG. 3B illustrates a generalized flow-chart of another method of determining an optimal overlay target.

Attention is now drawn to FIG. 3B, which is a variant of the method of FIG. 3A. In the method of FIG. 3B, the design data of a given overlay target are provided with a given range of variation, and this given range of variation is taken into account to select the optimal overlay target(s). Indeed, there is generally some deviation (manufacturing error) between the design data (defining the design of an overlay target) and the actual design of the manufactured overlay target. In addition, or alternatively, it may be desired to predict the impact of some variations in the design data on the ability of the overlay target(s) to provide accurate overlay measurements. It is therefore desired to determine whether the manufactured overlay target will provide accurate overlay measurements, even in the presence of these variations.

The method of FIG. 3B includes obtaining (operation $300_1$), for at least one given overlay target (or for each given overlay target) of the plurality of different overlay targets to be manufactured on a semiconductor specimen, design data of the given overlay target together with variation data informative of (possible) variations of at least part of the design data.

According to some examples, assume that the design data defines a given thickness (or a given density, or a given values of other parameters), e.g., for one or more features. The variation data can define a range of variations for this given thickness (or for this given density, or for other parameters). In some examples, this range of variations corresponds to variations that can be expected for this given thickness (or this given density, or other parameters) upon actual manufacturing of the feature. This range can be provided for example by the manufacturer, who has knowledge about the accuracy of the manufacturing process. Note that this range of variations does not necessarily reflect manufacturing error of the manufacturing process, but can be generated in order to predict the impact of these variations on the ability of the overlay target to provide accurate overlay measurements. For example, it can be desired to assess the impact of different thickness values (or different density values, or different values of other parameters) around a nominal value on the ability of an overlay target to provide, upon manufacturing, accurate overlay measurements.

In some examples, other types of variations can be tested, such as variations in the dimension(s) of the features, variations in the distance(s) between the features, variations in the geometry of the features, etc. In this case, the variation data can include corresponding range of variations.

Note that the range of variations is not limited to numerical variations. According to some examples, assume that the design data defines a given material (for example, Si), e.g., for one or more features. The range of variations can define other types of materials (e.g., $SiO_2$, Aluminium), for which it is desired to assess their impact on the ability of the overlay target to enable, upon manufacturing, accurate overlay measurements.

The method of FIG. 3B further includes (operation $305_1$) obtaining one or more parameters of an electron beam examination system. Operation $305_1$ is similar to operation 305 and is not described again.

The method of FIG. 3B further includes (operation $310_1$) simulating a plurality of image data of the at least one given overlay target (or of each of the given overlay targets) with design data varying according to the variation data. Simulation of image data can be performed using the simulation software 112. In other words, for the given overlay target (or for each given overlay target), for each different value of the design data (within the range of variations defined by the variation data), different image data is simulated. Operation $310_1$ enables generating a plurality of image data for at least one given overlay target (or for each given overlay target), wherein each image data is associated with a different variation of the design data (as defined by the variation data).

Figure 4C:
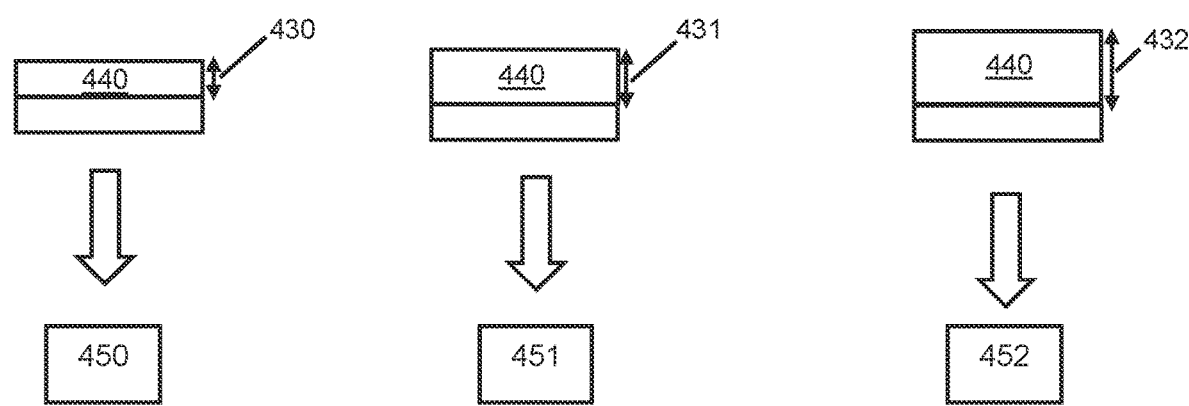
FIG. 4C illustrates an example of variations in the design data of an overlay target.

A non-limitative example is illustrated in FIG. 4C. Assume that the design data defines a given thickness 430 for a given layer 440 of a given overlay target, and that the variation data indicates two other possible values around this given thickness (see thickness 431 and thickness 432). As a consequence, for this given overlay target including this given layer 440, three image data 450, 451 and 452 are generated, one per thickness value (respectively 430, 431 and 432). Note that a different number of image data can be generated, and for different parameters of the design data.

In some examples, it is possible to vary simultaneously different data of the design data. For example, first image data is generated for a first pair of values of the thickness and density, second image data is generated for a second pair of values of the thickness and density, and third image data is generated for a third pair of values of the thickness and density.

The method of FIG. 3B further includes (operation $320_1$), for the at least one given overlay target (or for each given overlay target), using the plurality of image data to determine, before actual manufacturing of the given overlay target, a plurality of second data informative of estimated probability that the given overlay target, upon being manufactured according to the design data associated with said variation data, provides measurement data in an overlay measurement process meeting the measurement quality criterion.

Operation $320_1$ can include generating the second data for each image data of the plurality of image data obtained for a given overlay target. For a given overlay target, a plurality of values can therefore be obtained for each attribute (see examples of attributes above) of the second data. For example, assume that the plurality of image data has been generated for different values of the thickness. For a first value of the thickness, first value(s) can be obtained for the second data, for a second value of the thickness, second value(s) can be obtained for the second data, and for a third value of the thickness, third value(s) can be obtained for the third data. In other words, different values of the second data are obtained for the different variations of the design data, wherein each different value of the second data is informative of a different probability that the given overlay target, upon being manufactured according to this variation in the design data, provides measurement data in an overlay measurement process meeting the measurement quality criterion. A plurality of different probabilities can therefore be obtained for a given overlay target, for different variations in the design data.

A non-limitative example of an attribute used in the second data corresponds to the contrast. In the afore-mentioned example, for a first value of the thickness, a first value is obtained for the contrast, for a second value of the thickness, a second value is obtained for the contrast, and for a third value of the thickness, a third value is obtained for the contrast. The first value of the contrast is indicative of a first probability that the given overlay target, upon being manufactured according to the design data associated with this first value of the thickness, provides measurement data in an overlay measurement process meeting the measurement quality criterion. The second value of the contrast is indicative of a second probability that the given overlay target, upon being manufactured according to the design data associated with this second value of the thickness, provides measurement data in an overlay measurement process meeting the measurement quality criterion. The third value of the contrast is indicative of a third probability that the given overlay target, upon being manufactured according to the design data associated with this third value of the thickness, provides measurement data in an overlay measurement process meeting the measurement quality criterion.

This enables assessing to what extent a variation in the thickness impacts the contrast, which is one attribute informative of the probability that the overlay target will provide, upon manufacturing, measurement data in an overlay measurement process meeting the measurement quality criterion. This applies to other parameters of the design data, and to other attributes of the second data.

For each given overlay target, different values of the second data are obtained (since second data are computed for each image data, and each given overlay target is associated with a plurality of image data). These different values characterize the impact of the variations (as defined in the variation data) in the design data on the probability that the given overlay target, upon being manufactured according to the design data, provides measurement data in an overlay measurement process meeting the measurement quality criterion. As mentioned above, in some examples, the variation data reflect possible errors caused by the manufacturing process of the overlay target. It is therefore possible to assess whether the probability of an overlay target to enable accurate overlay measurements is sensitive (or insensitive) to these possible manufacturing errors. In other words, this can reflect the robustness of each overlay target with respect to possible variations in the design data.

The method of FIG. 3B further includes using (operation $330_1$) the plurality of second data of each given overlay target to select at least one optimal overlay target among the plurality of different overlay targets, wherein the at least one optimal overlay target is usable to be actually manufactured on the semiconductor specimen.

According to some examples, for each given overlay target, the plurality of second data can be used to compute a score, aggregating the different values obtained for the second data for the different variations in the design data. This score indicates the probability that the overlay target will be associated (upon its manufacturing on a specimen) with accurate overlay measurements, even in the presence of variations in the design data. For example, assume that the second data corresponds to the contrast of the image data. For a given overlay target, different values of the contrast have been obtained, reflecting different variations in the design data. In some examples, the score can reflect the average value of the different values of the contrast (the higher the average value, the higher the score, and conversely). This is not limitative.

In some examples, the score of a given overlay target can reflect different values of different attributes (of the second data), obtained by varying at least one parameter of the design data according to the variation data. For example, assume that a plurality of image data has been obtained (for different variations of at least one parameter of the design data). Assume, for the sake of the example, that the second data includes contrast and signal to noise ratio. For each image data, a different pair of values (one for the contrast, and one for the signal to noise ratio) is obtained. The score can be informative of an aggregation of the different pairs of values obtained for different image data of the given overlay target. For example, a first score can be computed for the contrast (based on the average of all contrast values) and a second score can be computed for the signal to noise ratio (based on the average of all values of the signal to noise ratio), and the score is computed based on the first score and the second score. This is not limitative.

According to some examples, operation $330_1$ can include selecting the candidate given overlay target(s) with the highest score as the optimal overlay target(s). The optimal overlay target, selected among the plurality of different overlay targets, can be output (for example on a display) to a user. The user can then decide to manufacture this optimal overlay target, and not the other candidate overlay targets.

Note that the method of FIG. 3B also enables determining for at least one given overlay target, data informative of an impact of one or more variations of at least part of the design data on an ability of the given overlay target, upon being manufactured, to provide measurement data in an overlay measurement process meeting the measurement quality criterion. Indeed, the method of FIG. 3B enables testing different variations of the design data (e.g., in terms of thickness, density, materials, etc.) and determining, for each variation, second data informative of estimated probability that the given overlay target, upon being manufactured according to this variation of the design data, provides measurement data in an overlay measurement process meeting the measurement quality criterion. It is therefore possible to characterize the impact of the variations in the design data in the ability of the given overlay target to provide (upon manufacturing) accurate overlay measurements.

In particular, the method of FIG. 3B enables correlating between variations in parameters of the overlay targets (such as type of materials, density, thickness, etc.) and the ability of the overlay target to provide accurate overlay measurements, before actual manufacturing of the overlay targets. It is therefore possible to assess the robustness of each overlay target with respect to these variations. It is also possible to select the optimal parameters in the design data, before actual manufacturing of the overlay targets, which will ensure accurate overlay measurements. For example, it is possible to choose the material which is the most adapted to ensure accurate overlay measurements. This is not limitative.

Figure 5A:
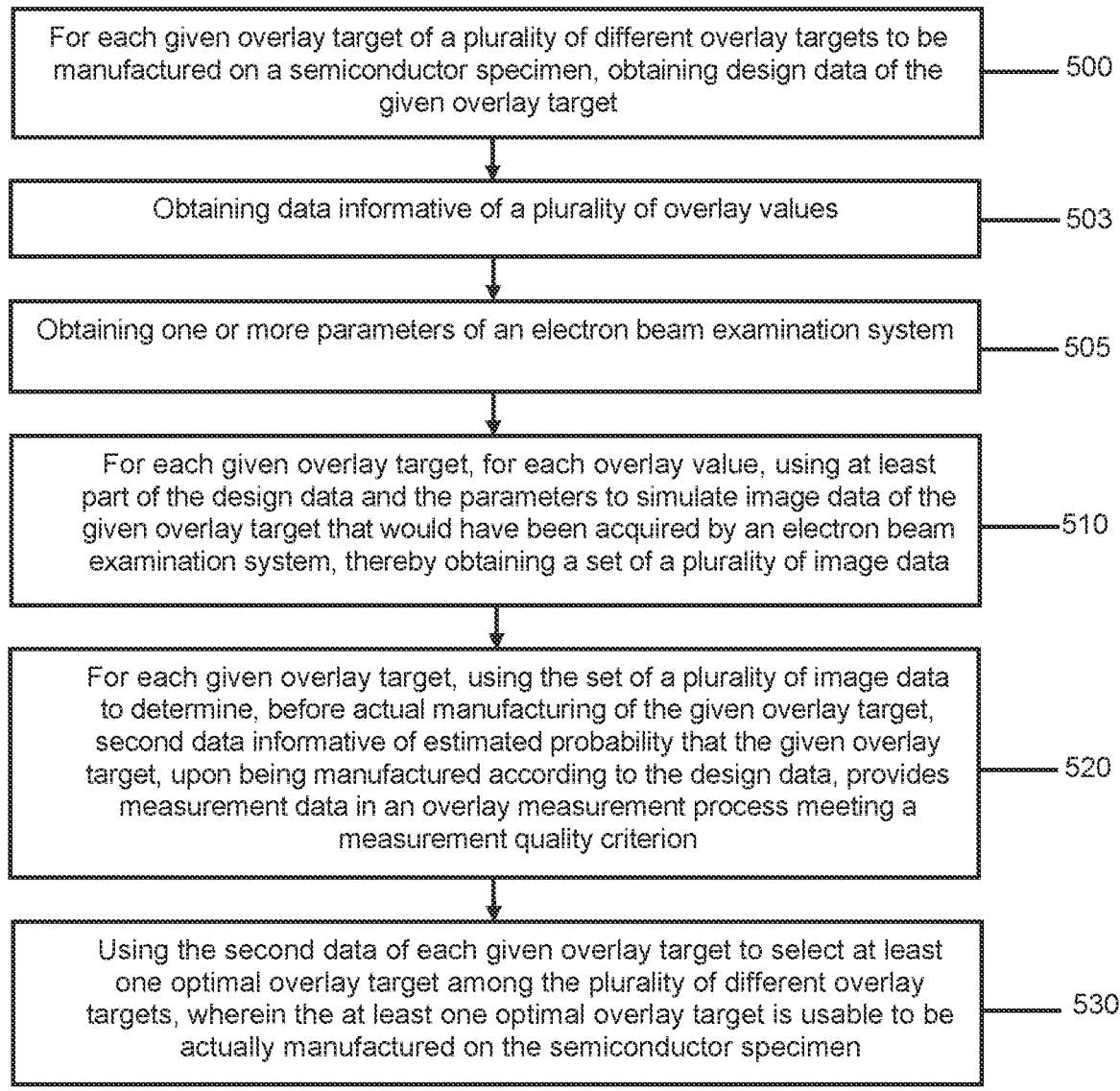
FIG. 5A illustrates a generalized flow-chart of another method of determining an optimal overlay target.

Attention is now drawn to FIG. 5A. The method of FIG. 5A enables testing whether different expected overlay values are measurable in the image data simulated for each of the candidate overlay targets. This is one possible indicator that enables selecting the overlay target(s) which is/are the most adapted for providing accurate overlay measurements.

The method of FIG. 5A includes obtaining (operation 500), for each given overlay target of a plurality of different overlay targets to be manufactured on a semiconductor specimen, design data of the given overlay target. Operation 500 is similar to operation 300 and is not described again.

The method of FIG. 5A further includes obtaining (operation 503) data informative of a plurality of overlay values. In some examples, data informative of a plurality of overlay values can be part of the design data. Data informative of a plurality of overlay values can include a range of values in which the overlay is expected to vary. This range of overlay values can reflect the expected range of the overlay error. For example, the manufacturer can indicate that for a given manufacturing process, it is expected to have an overlay error which varies between −2 nm and +2 nm (these values are not limitative). Note that the expected range of overlay values can be the same for all candidate overlay targets, or may differ between the candidate overlay targets. In some examples, the range of values in which the overlay may vary can be different for different pairs of layers, or for different axes (X or Y axis).

In some examples, data informative of a plurality of overlay values can include a range of values for which it is desired to test whether the overlay target will provide, upon manufacturing, measurement data (images) with a sufficient quality to measure these overlay values.

Figure 5B:
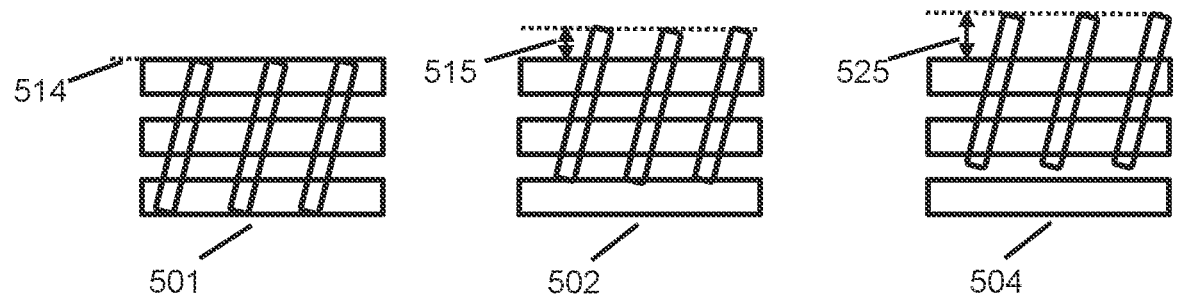
FIG. 5B illustrates different overlay targets associated with different values of overlay errors.

FIG. 5B illustrates an example of a given overlay target associated with three different values of the overlay (e.g., overlay error). On the left side of FIG. 5B (see reference 501), the overlay error 514 is equal to zero. In the center of FIG. 5B (see reference 502), the overlay error 515 has a first non-zero value. On the right side of FIG. 5B (see reference 504), the overlay error 525 has a second non-zero value, which is larger than the first value.

The method of FIG. 5A further includes (operation 505) obtaining one or more parameters of an electron beam examination system. Operation 505 is similar to operation 305 and is not described again.

The method of FIG. 5A further includes (operation 510), for each given overlay target, for each given overlay value of the one or more overlay values, using at least part of the design data and the given overlay value to simulate image data of the given overlay target associated with the given overlay value, that would have been acquired by an electron beam examination system. In other words, for a given overlay target, and for a given overlay value, the image of the given overlay target with this given overlay value is simulated. For each given overlay target, a set of a plurality of image data is therefore obtained (at least one image data per overlay value). Operation 510 can rely on the use of the simulation software 112, as explained with reference to operation 310.

Figure 5C:
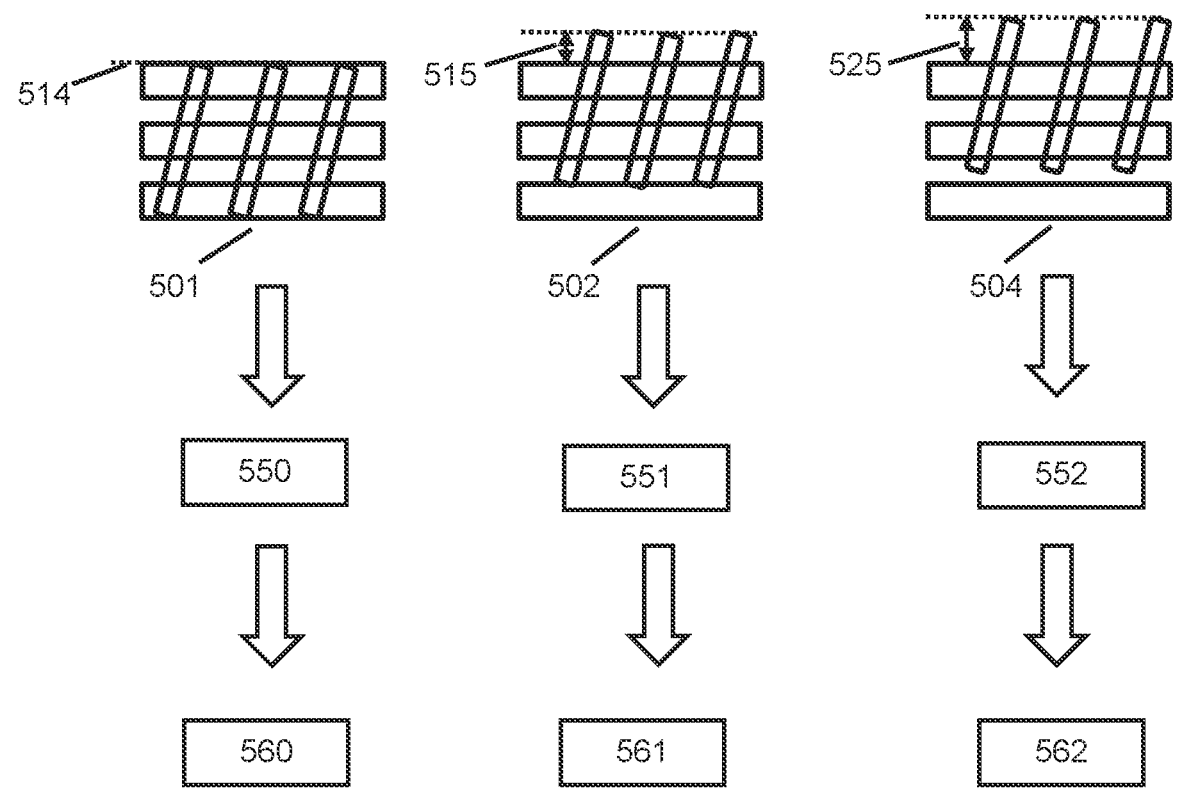
FIG. 5C illustrates different overlay targets associated with different values of overlay errors, together with corresponding simulated image data.

A non-limitative example is illustrated in FIG. 5C, in which a given overlay target is associated with three different values 514, 515 and 525 of the overlay error, as explained with reference to FIG. 5B. As a consequence, three image data 550, 551 and 552 (one per overlay error) can be obtained using the simulation software 112.

The method of FIG. 5A further includes (operation 520), for each given overlay target, using the set of a plurality of image data to determine, before actual manufacturing of the given overlay target, second data informative of estimated probability that the given overlay target, upon being manufactured according to the design data, provides measurement data in an overlay measurement process meeting the measurement quality criterion.

According to some examples, operation 520 can include determining a simulated overlay value in each image data of the set of a plurality of image data. Note that the simulated overlay value can be obtained by feeding the image to the overlay measurement software 115. As explained hereinafter, it is therefore possible to determine whether the overlay value visible in the simulated image (image data) corresponds to the overlay value used to simulate the image data.

In the example of FIG. 5C, simulated overlay 560 is obtained for image data 550, simulated overlay 551 is obtained of image data 561 and simulated overlay 562 is obtained for image data 552.

As mentioned above, each image data of the set of a plurality of image data has been obtained for a given overlay target associated with a given overlay value. The second data can include data informative of a difference between the overlay value and the simulated overlay value, for each image data of the set of a plurality of image data. In some examples, the second data can include an aggregation of all of these differences, for all image data of the set of a plurality of image data.

It is therefore determined to what extent each overlay value is measurable/reflected in the corresponding (simulated) image data. The higher the match between the overlay value and the simulated overlay value in the image data, the higher the probability that the given overlay target, upon being manufactured according to the design data, will provide measurement data in an overlay measurement process meeting the measurement quality criterion. Indeed, a good match indicates that the variations in the overlay will be visible in the images of the manufactured overlay target, which is an indication that the overlay target will provide measurement data (images) in an overlay measurement process meeting the measurement quality criterion (in this case, the measurement quality criterion indicates that the variations in the overlay are visible in the images).

Assume, for example, that a given overlay target is noted $OT_i$. Assume that the different overlay values (expected overlay errors) are noted $OE_i$ (with i from 1 to N). For each overlay value $OE_i$, image data $ID_{i,j}$ has been obtained, in which the simulated overlay is noted $O_{i,j}$. For each image data $ID_{i,j}$, the second data can include a comparison between the simulated overlay $O_{i,j}$ and the overlay value $OE_i$. Note that it is possible to aggregate this comparison for the different image data of a given overlay target: $\Sigma_{i=1}^{i=N} |O_{i,j} - OE_i|$ (Equation 1—this formula is not limitative).

According to some examples, for each given overlay target, a score can be obtained which reflects to what extent the overlay value(s) are measurable/reflected in the image data. This score is informative of estimated probability that the given overlay target, upon being manufactured according to the design data, provides measurement data in an overlay measurement process meeting the measurement quality criterion. In some examples, Equation 1 can be used to attribute a score to each overlay target, which reflects the probability that it will enable, upon manufacturing, accurate overlay measurements.

The method of FIG. 5A can further include using (operation 530) the second data of each given overlay target to select at least one optimal overlay target among the plurality of different overlay targets. Operation 530 is similar to operation 330. For example, the overlay target for which the different overlay values are more visible in the corresponding image data (designated above as simulated overlay values) can be selected as the optimal overlay target. In some examples, the overlay target with the highest score can be selected as the optimal overlay target. Note that the selection of the optimal overlay target can rely on additional criteria, as mentioned in the various examples above (see FIGS. 3A and 3B).

Figure 6:
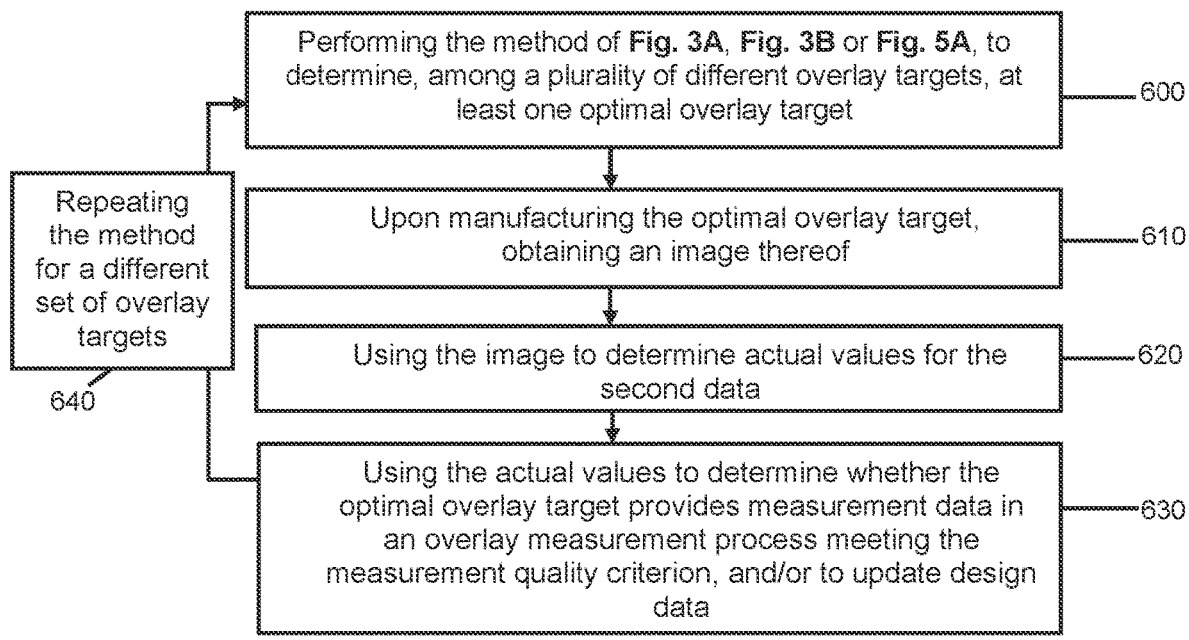
FIG. 6 illustrates a generalized flow-chart of an iterative method of determining an optimal overlay target.

Attention is now drawn to FIG. 6, which depicts an iterative process for generating optimal overlay targets.

The method of FIG. 6 includes (operation 600) performing the method of FIG. 3A, or 3B or 5A. As explained above, this enables determining at least one optimal overlay target.

The method of FIG. 6 further includes (operation 610), upon manufacturing of the optimal overlay target on a specimen, obtaining one or more images of the manufactured optimal overlay target, using an electron beam examination system (see reference 101 in FIG. 1). Note that the electron beam examination system may be used with the parameters (acquisition parameters) used at operation 310, $310_1$ and 510.

The method of FIG. 6 further includes (operation 620) using the image to compute actual values for one or more attributes of the second data. For example, the image can be used to determine at least one of: the contrast of the image, the signal to noise ratio of the image, the number of features in the image, the actual overlay in the image (several overlay values can be computed depending on the layers and/or the axes and/on the features for which overlay is assessed), etc. As mentioned above, one or more of these various attributes (which are part of the second data) may have been determined in the simulated image data, before actual manufacturing of the optimal overlay target (see operations 320, $320_1$, 520).

According to some examples, the actual values for the one or more attributes of the second data can be used to determine (see operation 630) whether the manufactured optimal overlay target provides measurement data in an overlay measurement process meeting the measurement quality criterion (such as accurate overlay measurements and/or repeatable overlay measurements). Indeed, as mentioned above, these attributes can reflect the quality of the image, which, in turn, determines whether the image enables accurate overlay measurements. For example, the contrast of the image can be determined. If this contrast is above a quality threshold (which can be set e.g., by a user), this indicates that the quality of the image is sufficient to provide accurate overlay measurements. The same process can be applied to the other attributes (e.g., signal to noise ratio, etc.) which can be compared to a quality threshold. If there is a match, this can indicate that the manufactured optimal overlay target enables accurate overlay measurements. According to some examples, if the actual values of the attributes extracted from the image indicate that the manufactured optimal overlay target provides measurement data in an overlay measurement process which do not meet the measurement quality criterion, it is possible to repeat the process of FIG. 6. According to some examples, the design data of the manufactured optimal overlay target can be modified. A user (such as an engineer) can use the simulated values and/or actual values of the second data to determine updated design data. In some examples, the engineer can propose a new overlay target with this updated design data, which can be manufactured and tested, by acquiring an image thereof using the electron beam examination system and measuring actual values for the attributes of the second data. These actual values can be used to decide whether the new overlay target provides measurement data in an overlay measurement process which meets the measurement quality criterion. In some examples, the engineer can propose a new set of overlay targets, which is different (with different design data) from the original set of overlay targets used at the first iteration of the method of FIG. 6. The method of FIG. 6 (operations 600 to 630) can be repeated (see reference 640) with this new set of overlay targets, in order to select at least one new optimal overlay target among this new set, and verify, after its manufacturing, whether the actual values for the second data indicate that accurate overlay measurements can be obtained. The method of FIG. 6 can be repeated until a convergence criterion is met. The convergence criterion can define that the process can be stopped when an overlay target has been manufactured, for which the overlay measurement data meets the measurement quality criterion.

According to some examples, the actual values of the overlay measured in the image can be compared to the expected values of the overlay (as defined in the design data). As mentioned above, the actual values of the overlay can include different values (depending on the layer(s), the axis, the individual features for which overlay is determined, etc.), which are compared to the corresponding expected values of the overlay (as defined in the design data). In some examples, since the overlay measurements are obtained from an electron beam examination system, it is possible to measure actual overlay between individual features (belonging for example to different layers). For example, it is possible to measure actual overlay between a first feature belonging to a first layer and a second feature belonging to a second layer. This actual overlay (computed for individual features) can be compared to the expected overlay (as defined in the design data) for these features. If there is a match, this can indicate that the manufactured optimal overlay target provides measurement data in an overlay measurement process meeting the measurement quality criterion. If there is a mismatch, the process of FIG. 6 can be repeated with different design data for the manufactured optimal overlay target and/or with a different set of candidate overlay targets.

According to some examples, the actual values of the second data (determined based on the image of the manufactured optimal overlay target) can be compared to the simulated values of the second data obtained based on image simulation for this optimal overlay target (see operation 630). If there is a match, this indicates that the design data are well calibrated, and adequately reflect the actual manufactured overlay target (since the actual values of the attributes match the simulated values of the attributes). If there is a mismatch, this can be indicative of the fact that one or more of the design data are not well calibrated. Indeed, it can occur that some values of the design data (such as density, composition of materials, thickness of some of the features) are not known or known with a low accuracy (at least for the user who runs the method of selection of the optimal overlay target). In this case, the design data can include an estimate for these values of the design data. If a mismatch between the attributes determined in the simulation of the overlay target, and the actual attributes determined for the manufactured overlay target is detected, this can indicate that the estimate of the design data is not accurate, and this can be used to improve the estimate of the design data. For example, assume that the actual contrast measured on an image of the manufactured overlay target does not match the simulated contrast determined based on the image data (at operation 320, 320₁ or 520). For example, assume that the actual contrast is lower than the simulated contrast. This can indicate that for at least one material, the estimated density (in the design data) is lower than the actual density. The design data can therefore be modified accordingly. Note that this enables modifying the design data of the manufactured overlay target, or of other overlay targets which may include this material. This example is not limitative. When it is detected that the design data needs to be updated, the method of FIG. 6 can be repeated with a new set of candidate overlay targets associated with the updated design data.

It is to be understood that the invention is not limited in its application to the details set forth in the description contained herein or illustrated in the drawings.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

What is claimed is:

1. A system comprising a processor and memory circuitry (PMC), the PMC being configured to:
   for each given overlay target of a plurality of different overlay targets to be manufactured on a semiconductor specimen, said given overlay target comprising a plurality of stacked semiconductor layers:
   obtain design data of the given overlay target,
   use at least part of the design data to simulate image data of the given overlay target that would have been acquired by an electron beam examination system,
   use the image data to determine, before actual manufacturing of the given overlay target, second data informative of an estimated probability that the given overlay target, upon being manufactured according to the design data, provides measurement data in an overlay measurement process meeting a measurement quality criterion, and
   use the second data of each given overlay target to select at least one optimal overlay target among the plurality of different overlay targets, wherein the at least one optimal overlay target is usable to be actually manufactured on the semiconductor specimen, and
   wherein the system is further configured to, after manufacturing of the optimal overlay target:
   obtain an inspection image of the optimal overlay target,
   determine actual values for the second data based on the inspection image, and
   use the actual values for the second data to update at least part of the design data of the optimal overlay target, or of another overlay target of the plurality of different overlay targets, or of another overlay target to be manufactured on a specimen.

2. The system of claim 1, configured to:
   obtain one or more parameters of the electron beam examination system, and
   use the one or more parameters and at least part of the design data to simulate image data of the given overlay target that would have been acquired by the electron beam examination system.

3. The system of claim 1, configured to:
   obtain data informative of a plurality of overlay values,
   for at least one given overlay target:
   for each given overlay value of the plurality of overlay values, use at least part of the design data to simulate image data of the given overlay target associated with the given overlay value, that would have been acquired by the electron beam examination system, thereby obtaining a set of a plurality of image data, and
   use the set of a plurality of image data to determine, before actual manufacturing of the given overlay target, second data informative of an estimated probability that the given overlay target, upon being manufactured according to the design data, provides measurement data in an overlay measurement process meeting the measurement quality criterion.

4. The system of claim 3, configured to determine, for each given image data of the set of a plurality of image data, obtained for the given overlay target associated with the given overlay value, a given simulated overlay value, wherein the second data is informative of a difference between the given simulated overlay value and the given overlay value.

5. The system of claim 1, configured to perform a comparison of at least part of the actual values for the second data determined based on the inspection image of the optimal overlay target, with at least part of the second data determined based on the image data of the optimal overlay target.

6. The system of claim 1, wherein the second data includes different attributes associated with a plurality of weights, wherein each given attribute is associated with a given weight, and wherein the system is configured to use the actual values to update one or more of the weights.

7. The system of claim 1, configured to, after manufacturing of the optimal overlay target:
   determine one or more actual values for the overlay in the inspection image and compare with one or more values for the overlay as defined in the design data.

8. The system of claim 1, wherein the second data is informative of a quality of the image data.

9. The system of claim 1, configured to:
   for at least one given overlay target, obtain design data together with variation data informative of variations of at least part of the design data,
   simulate a plurality of image data of the given overlay target with design data varying according to said variation data, that would have been acquired by the electron beam examination system, and
   use the plurality of image data, to determine, before actual manufacturing of the given overlay target, a plurality of second data informative of an estimated probability that the given overlay target, upon being manufactured according to said design data associated with said variation data, provides measurement data in an overlay measurement process meeting the measurement quality criterion.

10. The system of claim 9, wherein the variation data is informative of variations in at least one of thickness, or material, or density.

11. The system of claim 1, configured to determine, for at least one given overlay target, data informative of an impact of one or more variations of at least part of the design data on an ability of the given overlay target, upon being manufactured according to said design data associated with said one or more variations, to provide measurement data in an overlay measurement process meeting the measurement quality criterion.

12. The system of claim 1, configured to perform a sequence comprising:
   (1) for each given overlay target of a first plurality of different overlay targets to be manufactured on a semiconductor specimen, said given overlay target comprising a plurality of stacked semiconductor layers:
   obtain design data of the given overlay target,
   use at least part of the design data to simulate image data of the given overlay target that would have been acquired by an electron beam examination system,
   use the image data to determine, before actual manufacturing of the given overlay target, simulated second data informative of an estimated probability that the given overlay target, upon being manufactured according to the design data, provides measurement data in an overlay measurement process meeting a measurement quality criterion, and
   use the simulated second data of each given overlay target to select at least one optimal overlay target among the first plurality of different overlay targets;

(2) after manufacturing of the optimal overlay target, obtain an image thereof, and use the image to determine actual values for the second data; and (3) repeat (1) for a second plurality of overlay targets, different from the first plurality of different overlay targets.

13. The system of claim 12, configured to perform a comparison between the actual values for the second data of the optimal overlay target with the simulated second data of the optimal overlay target, and output data informative of the comparison.

14. A computer-implemented method comprising:
for each given overlay target of a plurality of different overlay targets to be manufactured on a semiconductor specimen, said given overlay target comprising a plurality of stacked semiconductor layers:
obtaining design data of the given overlay target,
using at least part of the design data to simulate image data of the given overlay target that would have been acquired by an electron beam examination system,
using the image data to determine, before actual manufacturing of the given overlay target, second data informative of an estimated probability that the given overlay target, upon being manufactured according to the design data, provides measurement data in an overlay measurement process meeting a measurement quality criterion, and
using the second data of each given overlay target to select at least one optimal overlay target among the plurality of different overlay targets, wherein the at least one optimal overlay target is usable to be actually manufactured on the semiconductor specimen,
after manufacturing of the optimal overlay target:
obtaining an inspection image of the optimal overlay target,
determining actual values for the second data based on the inspection image, and
using the actual values for the second data to update at least part of the design data of the optimal overlay target, or of another overlay target of the plurality of different overlay targets, or of another overlay target to be manufactured on a specimen.

15. The method of claim 14, comprising:
obtaining one or more parameters of the electron beam examination system, and
using the one or more parameters and at least part of the design data to simulate image data of the given overlay target that would have been acquired by the electron beam examination system.

16. The method of claim 14, comprising:
obtaining data informative of a plurality of overlay values,
for at least one given overlay target:
for each given overlay value of the plurality of overlay values, using at least part of the design data to simulate image data of the given overlay target associated with the given overlay value, that would have been acquired by the electron beam examination system, thereby obtaining a set of a plurality of image data, and
using the set of a plurality of image data to determine, before actual manufacturing of the given overlay target, second data informative of an estimated probability that the given overlay target, upon being manufactured according to the design data, provides measurement data in an overlay measurement process meeting the measurement quality criterion.

17. The method of claim 14, comprising:
for at least one given overlay target, obtaining design data together with variation data informative of variations of at least part of the design data,
simulating a plurality of image data of the given overlay target with design data varying according to said variation data, that would have been acquired by the electron beam examination system, and
using the plurality of image data, to determine, before actual manufacturing of the given overlay target, a plurality of second data informative of an estimated probability that the given overlay target, upon being manufactured according to said design data associated with said variation data, provides measurement data in an overlay measurement process meeting the measurement quality criterion.

18. A system comprising a processor and memory circuitry (PMC), the PMC being configured to:
for each given overlay target of a plurality of different overlay targets to be manufactured on a semiconductor specimen, said given overlay target comprising a plurality of stacked semiconductor layers:
obtain design data of the given overlay target,
use at least part of the design data to simulate image data of the given overlay target that would have been acquired by an electron beam examination system,
use the image data to determine, before actual manufacturing of the given overlay target, second data informative of an estimated probability that the given overlay target, upon being manufactured according to the design data, provides measurement data in an overlay measurement process meeting a measurement quality criterion, and
use the second data of each given overlay target to select at least one optimal overlay target among the plurality of different overlay targets, wherein the at least one optimal overlay target is usable to be actually manufactured on the semiconductor specimen,
wherein the system is further configured to, after manufacturing of the optimal overlay target:
obtain an inspection image of the optimal overlay target, and
determine actual values for the second data based on the inspection image,
wherein the second data includes different attributes associated with a plurality of weights, wherein each given attribute is associated with a given weight, and wherein the system is configured to use the actual values to update one or more of the weights.

19. A computer-implemented method comprising:
for each given overlay target of a plurality of different overlay targets to be manufactured on a semiconductor specimen, said given overlay target comprising a plurality of stacked semiconductor layers:
obtaining design data of the given overlay target,
using at least part of the design data to simulate image data of the given overlay target that would have been acquired by an electron beam examination system,
using the image data to determine, before actual manufacturing of the given overlay target, second data informative of an estimated probability that the given overlay target, upon being manufactured according to the design data, provides measurement data in an overlay measurement process meeting a measurement quality criterion, and
using the second data of each given overlay target to select at least one optimal overlay target among the plurality of different overlay targets, wherein the at least one optimal overlay target is usable to be actually manufactured on the semiconductor specimen,
after manufacturing of the optimal overlay target:
obtaining an inspection image of the optimal overlay target, and
determining actual values for the second data based on the inspection image,
wherein the second data includes different attributes associated with a plurality of weights, wherein each given attribute is associated with a given weight, and wherein the method further comprises using the actual values to update one or more of the weights.

* * * * *